United States Patent [19]

Miller et al.

[11] 3,921,125

[45] Nov. 18, 1975

[54] COAXIAL ELECTRET HYDROPHONE

[75] Inventors: Gerald K. Miller, Saratoga; Sam Lum, San Jose, both of Calif.

[73] Assignee: GTE Sylvania Incorporated, Mountain View, Calif.

[22] Filed: June 28, 1974

[21] Appl. No.: 483,959

[52] U.S. Cl. ................... 340/7 R; 174/107; 340/261
[51] Int. Cl.² ............................................ G01V 1/00
[58] Field of Search ................ 340/7, 261; 174/107

[56] References Cited
UNITED STATES PATENTS

| | | | |
|---|---|---|---|
| 3,433,687 | 3/1969 | Price | 174/102 |
| 3,681,515 | 8/1972 | Mildner | 174/107 |
| 3,739,326 | 6/1973 | Kerr et al. | 340/7. R |
| 3,763,482 | 10/1973 | Burney et al. | 340/258 R |

*Primary Examiner*—Maynard R. Wilbur
*Assistant Examiner*—S. C. Buczinski
*Attorney, Agent, or Firm*—John F. Lawler; Norman J. O'Malley; Elmer J. Nealon

[57] ABSTRACT

The utility of a coaxial electret cable transducer as a hydrophone is substantially improved by securing the outer conductor of the cable to the inner surface of the resilient jacket or cover of the cable. Such cable loses transducer sensitivity after being subjected to high pressure. It has been discovered that such desensitization of the cable occurs as a result of the difference in elasticity of the outer conductor and the jacket which surrounds it; compensating for this elastic differential of these two cable parts by mechanically securing them together prevents loss of sensitivity upon depressurization.

4 Claims, 3 Drawing Figures

COAXIAL ELECTRET HYDROPHONE

The invention herein described was made under a contract with the Department of the Navy.

BACKGROUND OF THE INVENTION

This invention relates to hydrophones and more particularly to a hydrophone comprising a coaxial electret cable.

The coaxial electret cable described in U.S. Pat. No. 3,763,482 is an extremely sensitive transducer capable of detecting mechanical impacts and vibrations applied to the exterior of the cable at any point along its length. Such a transducer is useful as a hydrophone for sensing underwater vibrations such as soundings produced during undersea seismic exploration and the like. For example, the coaxial electret cable may be towed behind a surface vessel at depths up to 1,500 meters for sensing sonic vibrations reflected from the floor of the sea and providing output signals indicative of the character and composition of the sea floor.

The advantage of the coaxial electret cable as a hydrophone is not only its high sensitivity but also its low cost. Furthermore, electret cables are capable of readily being conditioned so as to produce signals which indicate the positions along their length at which vibrations are sensed; examples of such cables are described in copending applications Ser. Nos. 393,797 and 393,796, now U.S. Pat. Nos. 3,831,162 and 3,836,399 respectively, assigned to the assignee of this invention.

A difficulty experienced with use of the aforementioned electret cable as a hydrophone is a substantial loss of sensitivity following depressurization of the cable after having been subjected to large external pressures corresponding to water depths of 1,500 meters; such loss of sensitivity has exceeded 13 db. This phenomenon can severely limit the usefulness of the coaxial electret cable as a hydrophone.

It is therefore an object of the invention to provide an improved coaxial electret cable that is useful as a hydrophone without losing signal detection sensitivity upon depressurization.

This invention is based on the discovery that the normally tight fit of the cable jacket on the outer conductor is loosened when the ambient pressure is reduced from high to lower levels. This is due to the difference in elasticity of the jacket and outer conductor and results in a mechanical decoupling between these parts at the lower pressures. In accordance with this invention, the outer conductor is securely bonded to the jacket to prevent separation and decoupling of these parts when external pressure on the cable is relieved thereby maintaining a substantially constant sensitivity under different ambient pressures.

DESCRIPTION OF PREFERRED EMBODIMENT

Figure 1:
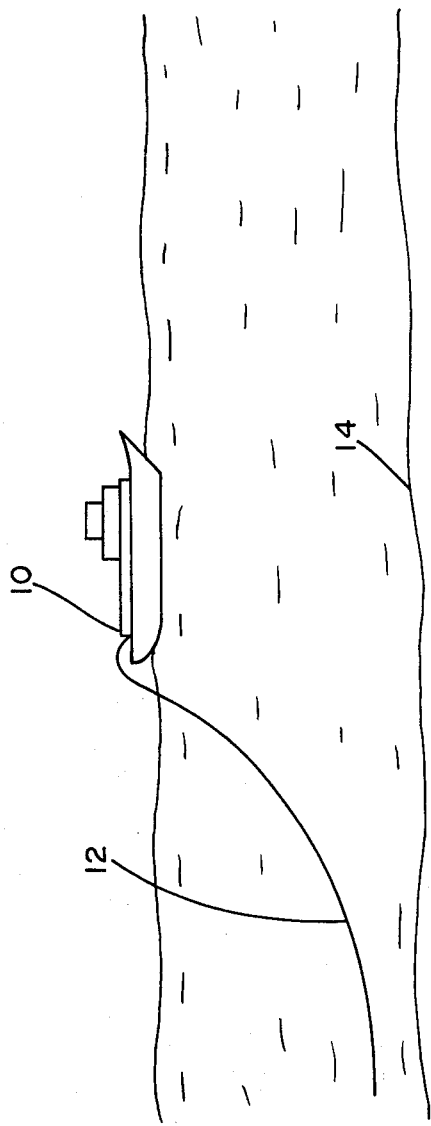
FIG. 1 is a schematic view of a coaxial electret cable embodied as a hydrophone for undersea seismic exploration.
Figure 3:
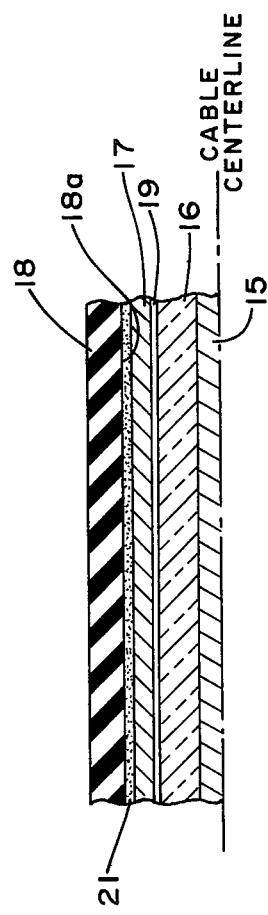
FIG. 3 is a greatly enlarged transverse section of part of the coaxial cable transducer embodying this invention.
Figure 2:
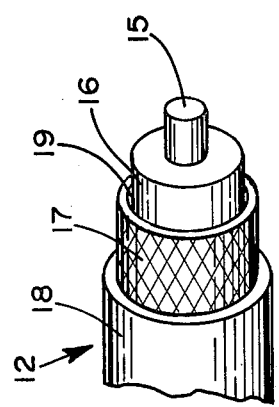
FIG. 2 is a fragmentary cut-away perspective view of a coaxial cable transducer embodying this invention.

Referring now to the drawings, FIG. 1 shows a surface ship 10 from which a coaxial electret cable 12 embodying the invention trails in the water in proximity to the sea floor 14. This cable may be submerged to depths of 1,000 to 3,000 meters or greater and may be 1,000 meters or greater in length for purposes of detecting reflections of seismic waves from the sea floor in the manner well known in the art of undersea geophysical exploration. Electrical signals induced in the cable by these vibrations are recorded and analyzed by suitable electronic equipment carried on the vessel 10 for carrying out the purposes of the exploration.

The coaxial cable transducer 12 comprises an inner conductor 15, a dielectric filler 16, preferably a fluorocarbon material that is an electret, a metallic outer conductor 17 such as braided wire and a jacket 18 made of a waterproof polymer material such as polyvinylchloride, polytetrafluoroethylene, or the like tightly surrounding the outer conductor 17. Although the outer conductor 17 is snugly applied to the outer surface of dielectric filler 16 in the cable manufacturing process, there is an effective air gap 19 between these parts which is responsible in part for the transducer action of the cable as explained in the foregoing patent.

Because of electric charges in the electret layer 16, any motion of outer conductor 17 relative to layer 16 produces a charge flow in the conductor capable of being sensed by appropriate electronic apparatus connected across the inner and outer conductors at any point along the cable. An external acoustic signal or mechanical vibration impressed on the cable displaces cable jacket 18. Depending on the tightness of coupling between jacket 18 and outer conductor 17, this motion is passed with some attenuation to outer conductor 17 which changes the width of air gap 19 and results in an electrical signal across the inner and outer conductors. However, upon exposure of the cable to underwater pressures at substantial depths, such as 1,500 meters, the cable transducer loses some of its signal generating sensitivity which is not regained upon subsequent depressurization. While the original sensitivity is substantially regained upon re-exposure of the depressurized cable to the same high pressure, the sensitivity is not fully regained if the cable is submerged at a shallower depth where the pressure is less.

We have discovered that this sensitivity loss upon change of ambient pressure is due to the difference in inherent elasticity between jacket 18 and outer conductor 17 such that the latter takes a mechanical set during pressurization which remains upon depressurization whereas jacket 18, being more elastic, assumes its original size and shape. The result of this differential elasticity is a decoupling or separation of the jacket and the inelastic outer conductor so as to inhibit the transfer of mechanical energy from the exterior of the cable to the outer conductor and thereby decreasing the transducing sensitivity of the cable.

In order to eliminate such decoupling, outer conductor 17 is mechanically fastened or bonded to the inner surface 18a of the jacket, preferably during the cable manufacturing process, so that these parts remain secured tightly together as the cable is depressurized. One technique for bonding the outer conductor and jacket together for this purpose is the use of an adhesive layer 21 between these parts. An example of an adhesive useful for such bonding is a thermosetting inorganic resin or a silicone adhesive system. Other fastening techniques include fuse bonding the outer conductor to the inner surface of jacket 18 as is done between metallized foil backed Mylar, for example, embedding the outer conductor in the jacket so as to mechanically interlock them, or attaching the outer conductor to the jacket at a plurality of points as by spot bonding using any of the previous methods. Thus, the effect of the difference in elasticity of the outer conductor and jacket is compensated and the electret cable sensitivity is made substantially independent of its pressure history.

What is claimed is:

1. A hydrophone comprising
   a cable having an inner conductor and an outer conductor and a dielectric filler between said conductors, said filler comprising an electret, and
   a jacket disposed around said outer conductor, said jacket being elastic whereby to return to the original shape upon removal of an externally applied pressure, said outer conductor being characterized by retention of a mechanical set upon removal of such pressure,
   said jacket being permanently secured to said outer conductor whereby to prevent separation of the jacket from the outer conductor upon decrease of said pressure.

2. The hydrophone according to claim 1 in which said jacket is adhesively bonded to said outer conductor.

3. The hydrophone according to claim 1 in which said jacket is fuse bonded to said outer conductor.

4. The hydrophone according to claim 1 in which said outer conductor is embedded in said jacket whereby to mechanically interlock same.

* * * * *